US012154532B2

(12) United States Patent
Luo

(10) Patent No.: US 12,154,532 B2
(45) Date of Patent: Nov. 26, 2024

(54) CARLIMBA BRACKET AND CARLIMBA

(71) Applicant: Jinkai Luo, Guangzhou (CN)

(72) Inventor: Jinkai Luo, Guangzhou (CN)

(73) Assignee: Jinkai Luo, Guangzhou (CN)

( * ) Notice: Subject to any disclaimer, the term of this patent is extended or adjusted under 35 U.S.C. 154(b) by 247 days.

(21) Appl. No.: 17/926,742

(22) PCT Filed: Apr. 13, 2021

(86) PCT No.: PCT/CN2021/086977
§ 371 (c)(1),
(2) Date: Nov. 21, 2022

(87) PCT Pub. No.: WO2021/233020
PCT Pub. Date: Nov. 25, 2021

(65) Prior Publication Data

US 2023/0282187 A1 Sep. 7, 2023

(30) Foreign Application Priority Data

May 21, 2020 (CN) ......................... 202010435483.3

(51) Int. Cl.
*G10D 13/08* (2020.01)
*G10D 13/10* (2020.01)

(52) U.S. Cl.
CPC ............. *G10D 13/08* (2013.01); *G10D 13/10* (2020.02)

(58) Field of Classification Search
CPC ...................................................... G10D 13/08
See application file for complete search history.

(56) References Cited

U.S. PATENT DOCUMENTS 1,763,518 A * 6/1930 Haweis .................. G10D 13/08 84/408
3,301,118 A * 1/1967 Keane .................... G10H 3/181 984/367
3,610,085 A * 10/1971 Wilson et al. ......... G10D 13/08 84/408

(Continued)

FOREIGN PATENT DOCUMENTS

CN 209487138 U 10/2019
CN 210378429 U 4/2020

(Continued)

*Primary Examiner* — Robert W Horn

(57) ABSTRACT

The present invention provides a carlimba bracket and a carlimba. The carlimba bracket includes bracket units. Each bracket unit includes a front nut, a back nut and a bridge; the bridge is located between the front nut and the back nut; a first connecting piece is arranged between the front nut and the bridge and fixedly connected with the front nut and the bridge; a second connecting piece is arranged between the back nut and the bridge and fixedly connected with the back nut and the bridge; a front supporting position is arranged at the upper part of the front nut; a back supporting position is arranged at the upper part of the back nut; a downward pressing portion is arranged at the lower part of the bridge; and an elastic piece gap is reserved among the pressing portion, the front supporting position and the back supporting position. The carlimba bracket and the carlimba are convenient to assemble, are small in error after assembly and can adapt to various scale arrangements.

11 Claims, 23 Drawing Sheets

(56) References Cited

U.S. PATENT DOCUMENTS

| | | | | | |
|---|---|---|---|---|---|
| 3,961,553 | A * | 6/1976 | Schorr | G10D 13/08 | |
| | | | | 84/408 | |
| 7,919,700 | B2 * | 4/2011 | Saragosa | G10D 13/08 | |
| | | | | 84/402 | |
| D1,017,687 | S * | 3/2024 | Chen | D17/7 | |
| 2004/0137984 | A1 * | 7/2004 | Salter | A63F 13/245 | |
| | | | | 463/35 | |
| 2023/0282187 | A1 * | 9/2023 | Luo | G10D 13/10 | |
| | | | | 84/1 | |

FOREIGN PATENT DOCUMENTS

| | | | | |
|---|---|---|---|---|
| CN | 111768750 | A | 10/2020 | |
| CN | 213545896 | U | 6/2021 | |
| NL | 1028323 | C2 * | 8/2006 | G10D 13/08 |
| WO | WO-2022068283 | A1 * | 4/2022 | |

* cited by examiner

CARLIMBA BRACKET AND CARLIMBA

CROSS-REFERENCE TO RELATED APPLICATIONS

The application claims priority to Chinese patent application No. 202010435483.3, filed on May 21, 2020, the entire contents of which are incorporated herein by reference.

TECHNICAL FIELD

The present invention relates to the field of musical instruments, and in particular to a carlimba bracket and a carlimba.

BACKGROUND

A carlimba is a musical instrument originated from Africa and generally includes a body, 1-2 rows of metal elastic pieces and a carlimba bracket. The carlimba bracket includes front and back nuts and a bridge; the elastic pieces are arranged on the front and back nuts; the bridge between the two nuts presses the elastic pieces downward to enable the elastic pieces to be under a certain level of tension; and the elastic pieces are vibrated to make a sound when the ends of the elastic pieces are plucked by fingers. By using the front and back nuts and the bridge which are separate from each other, an existing carlimba bracket has a large error in manufacturing and assembly and cannot adapt to various scale arrangements.

SUMMARY

Based on the above, it is necessary to provide a carlimba bracket and a carlimba which are convenient to assemble, are small in error after assembly and can adapt to various scale arrangements.

The embodiments of the present invention provide a carlimba bracket, including bracket units. Each bracket unit includes a front nut, a back nut and a bridge; the bridge is located between the front nut and the back nut; a first connecting piece is arranged between the front nut and the bridge and fixedly connected with the front nut and the bridge; a second connecting piece is arranged between the back nut and the bridge and fixedly connected with the back nut and the bridge; a front supporting position is arranged at the upper part of the front nut; a back supporting position is arranged at the upper part of the back nut; a downward pressing portion is arranged at the lower part of the bridge; and an elastic piece gap is reserved among the pressing portion, the front supporting position and the back supporting position.

Preferably, the front nuts, the back nuts, the bridges, the first connecting pieces and the second connecting pieces are integrally formed.

Preferably, each front nut is an upright column, and each front supporting position is a groove formed in the upper part of the front nut; each back nut is a supporting plate, and one end, close to the front nut, of the back nut is lower than the other end; each second connecting piece is a supporting vertical plate, and the pressing portion is fixed onto the upper part of the supporting vertical plate; and the supporting vertical plate extends in a direction toward the back nut, and the back nut is further fixed onto the upper part of the supporting vertical plate. Each first connecting piece is a connecting plate, one end of the first connecting piece is fixedly connected to the lower part of the front nut, and the other end is fixedly connected to the lower part of the supporting vertical plate.

Preferably, each supporting vertical plate includes a first supporting vertical plate and a second supporting vertical plate; the first supporting vertical plate and the second supporting vertical plate are opposite to each other, a gap is reserved therebetween; a cavity is formed among the first supporting vertical plate, the second supporting vertical plate, the bridge and the back nut; the lower end of the cavity is opened to form a demoulding hole; and a bottom plate is further fixedly connected to the lower parts of the first supporting vertical plate and the second supporting vertical plate and is fixedly connected with the first supporting vertical plate and the second supporting vertical plate.

Preferably, the carlimba bracket further includes auxiliary bridges, where auxiliary through holes are formed in the bridges; and the auxiliary bridges penetrate through the auxiliary through holes and are movable relative to the bridges.

Preferably, each first connecting piece is a connecting plate, and each second connecting piece is also a connecting plate; two supporting plates opposite to each other are arranged at the lower part of each bridge and fixed onto the first connecting piece and the second connecting piece, each bridge is fixed onto the upper parts of the two supporting plates, and the demoulding hole is formed in each bridge; and one end of each back nut is fixedly connected with the second connecting piece, and the other end is connected with a nut supporting plate.

Preferably, the carlimba bracket includes a plurality of bracket units; the plurality of bracket units are flush arranged; or the plurality of bracket units are arranged in a retrograding manner.

Preferably, the carlimba bracket includes a plurality of bracket units. Each bracket unit includes a first bracket unit and a second bracket unit, the front nut, the back nut and the bridge of the first bracket unit are higher than those of the second bracket unit, and the first bracket unit and the second bracket unit are fixedly connected with each other; the plurality of bracket units are flush arranged; or the plurality of bracket units are arranged in a retrograding manner, and the first bracket units and the second bracket units are also arranged in the retrograding manner.

Preferably, the carlimba bracket includes first bracket units and second bracket units. Each first bracket unit is located at the upper part of each second bracket unit; the first bracket unit and the second bracket unit are integrally formed; the first bracket unit includes a first front nut, a first back nut and a first bridge; the second bracket unit includes a second front nut, a second back nut and a second bridge; the second bridge is located at the lower part of the first front nut; and the second back nut is located at the lower part of the first bridge.

The present invention further provides a carlimba, including elastic pieces and the carlimba bracket according to any one of the items. The elastic pieces are inserted into the elastic piece gaps.

Preferably, the carlimba further includes a body; and the carlimba bracket is fixed to the body.

In the present invention, the first connecting pieces and the second connecting pieces are provided. By fixedly connecting the front nuts, the back nuts and the bridges through the first connecting pieces and the second connecting pieces, during assembly, there is no need for assembling the carlimba bracket. Therefore, compared with the existing carlimba, the carlimba is convenient to assemble, and an error that may occur during assembly of the carlimba bracket is avoided. By reserving the elastic piece gaps among the front nuts, the back nuts and the bridges, the elastic pieces may be just inserted into the elastic piece gaps, and thus assembly is convenient. In addition, the elastic piece are convenient to replace, and various scale arrangements may be formed by replacing the elastic pieces.

BRIEF DESCRIPTION OF DRAWINGS

The above and other objectives, features and advantages of the present invention will become clearer by more specifically describing preferred embodiments of the present invention with reference to the accompanying drawings. Like reference numbers in all the drawings represent like parts, and the drawings are not intentionally drawn on actual size or other scales, emphasis instead being placed upon illustrating the gist of the present invention.

REFERENCE NUMERALS

1. Elastic piece, 11. First elastic piece, 12. Second elastic piece, 2. Front nut, 21. First front nut, 22. Second front nut, 3. Bridge, 30. Auxiliary bridge, 31. First bridge, 32. Second bridge, 300. Supporting plate, 4. Back nut, 40. Nut supporting plate, 41. First back nut, 42. Second back nut, 5. Second connecting piece, 6. First connecting piece, 7. Demoulding hole, 8. Through hole, 9. Screw, 10. Body, 13. Bottom plate, 14. Back column, 15. Top opening.

DETAILED DESCRIPTION OF THE EMBODIMENTS

In order to facilitate understanding of the present invention, the present invention will more fully described with reference to the accompanying drawings below.

It is noted that when an element is considered as being “connected” to another element, it can be directly connected to or combined with the other element, or intervening elements may be present at the same time. The terms “mounting”, “one end”, “the other end” or other similar terms used herein is for the purpose of description only.

Unless defined otherwise, all technical and scientific terms used herein have the same meaning as commonly understood by one of skills in the art. The terms used in the specification herein are for the purpose of describing particular embodiments only and are not intended to be limiting of the present invention. The terms “and/or” used herein includes any and all combinations of one or more of the associated listed items.

Figure 1:
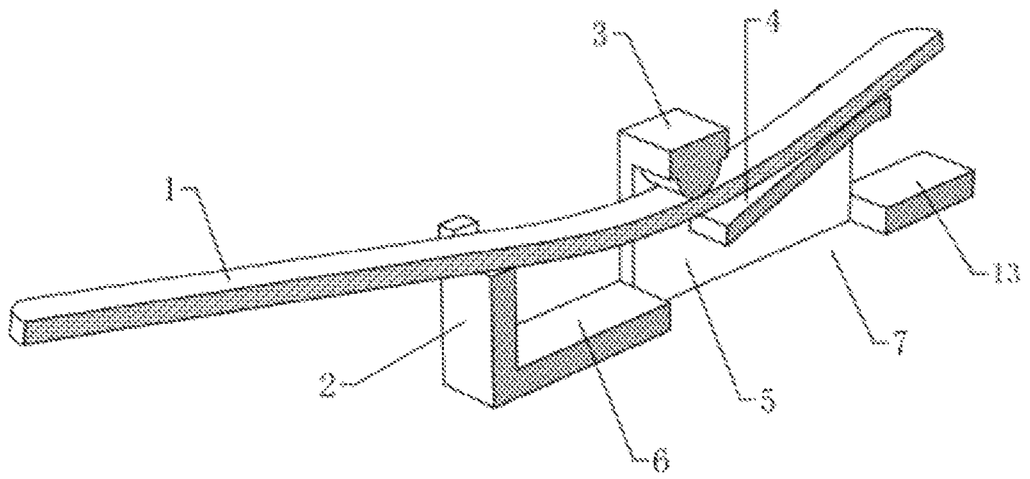
FIG. 1 is a longitudinal sectional view of a bracket unit according to a preferred embodiment.
Figure 2:
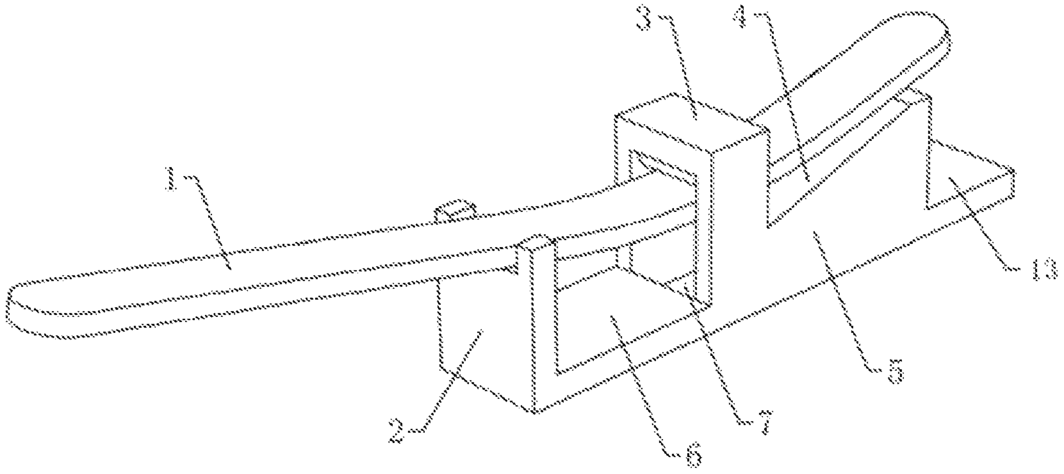
FIG. 2 is an overall structural diagram of a bracket unit according to a preferred embodiment.
Figure 3:
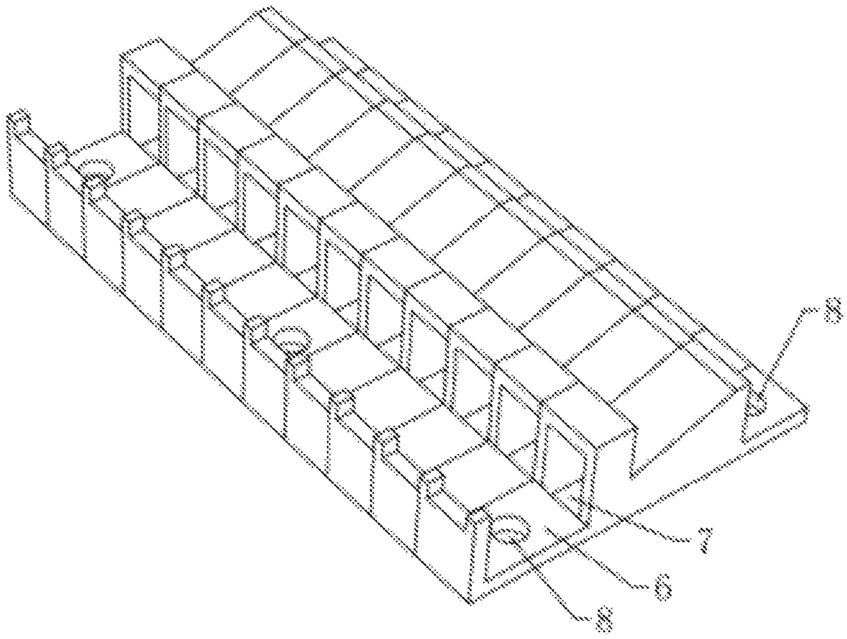
FIG. 3 is an overall structural diagram of a flush carlimba bracket.
Figure 4:
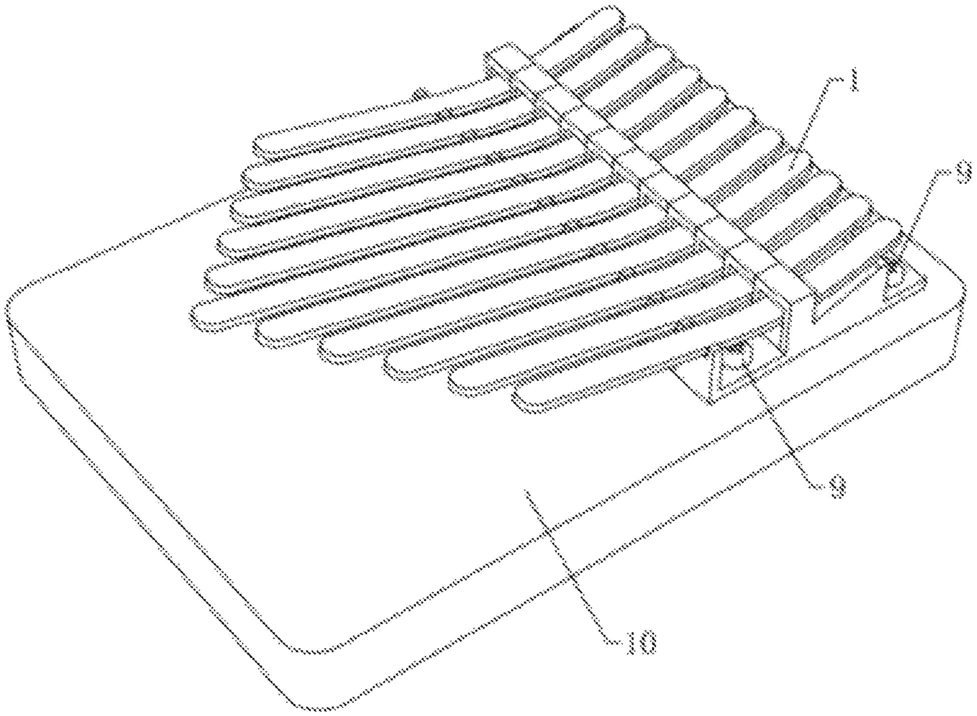
FIG. 4 is an overall structural diagram of a carlimba using a flush carlimba bracket.
Figure 5:
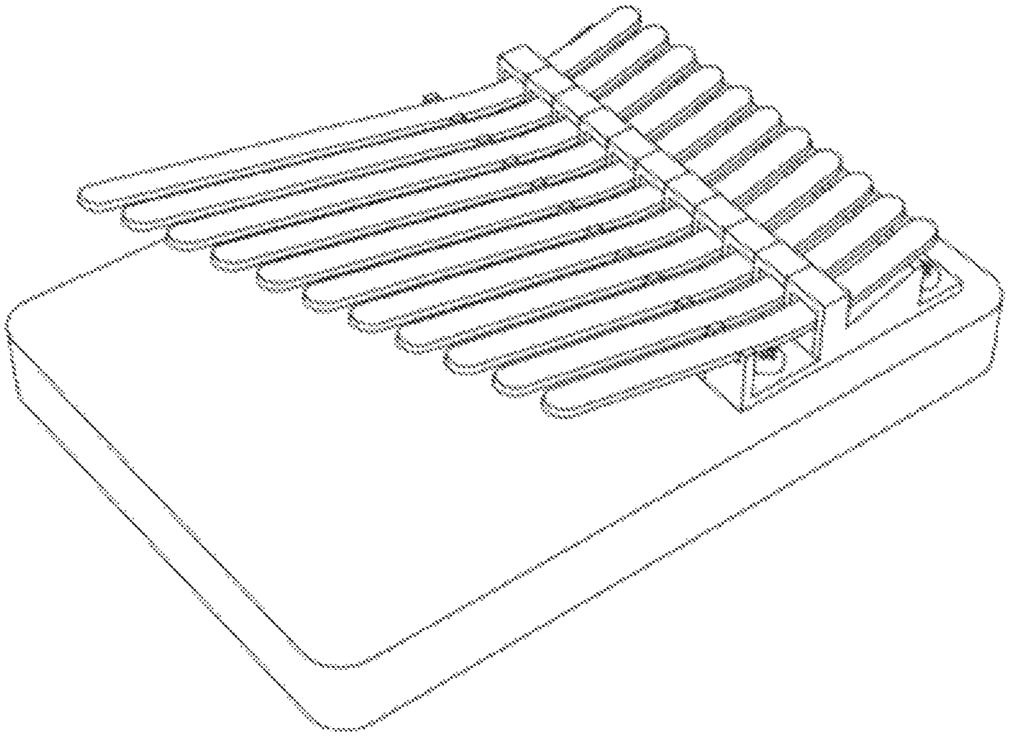
FIG. 5 is an overall structural diagram of another carlimba using a flush carlimba bracket.
Figure 6:
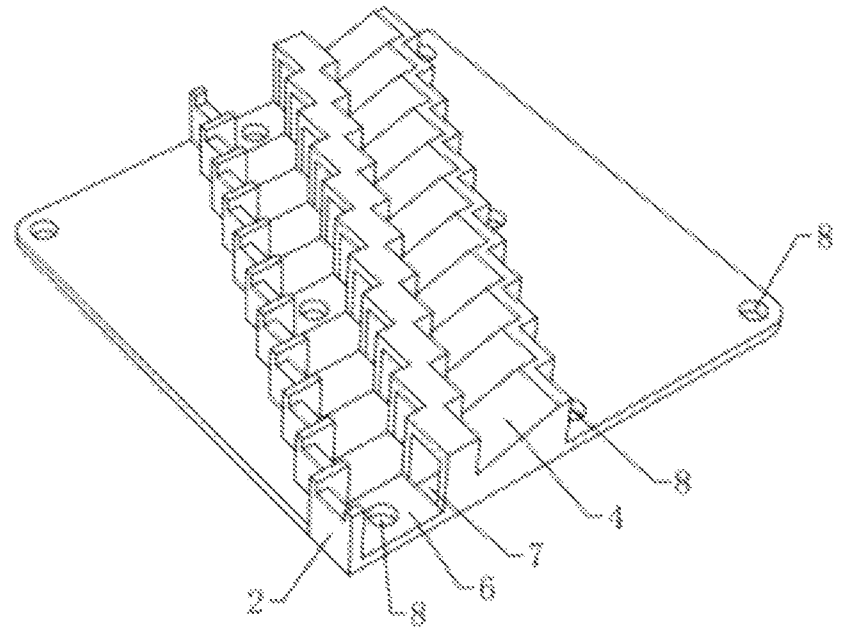
FIG. 6 is an overall structural diagram of a retrograding carlimba bracket.
Figure 7:
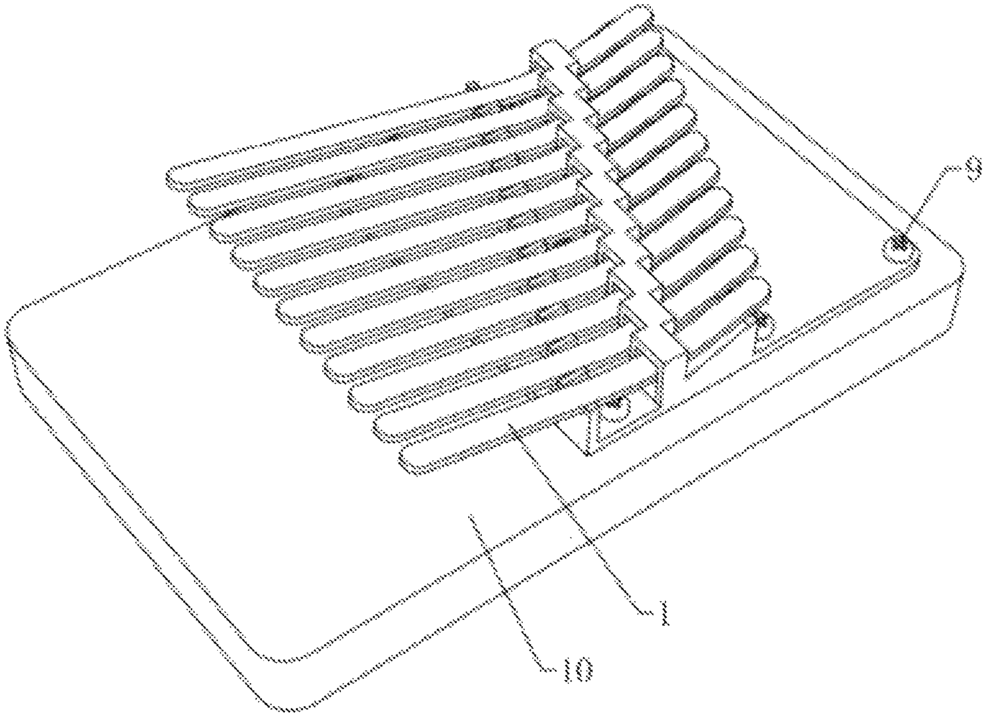
FIG. 7 is an overall structural diagram of a carlimba using a retrograding carlimba bracket.
Figure 8:
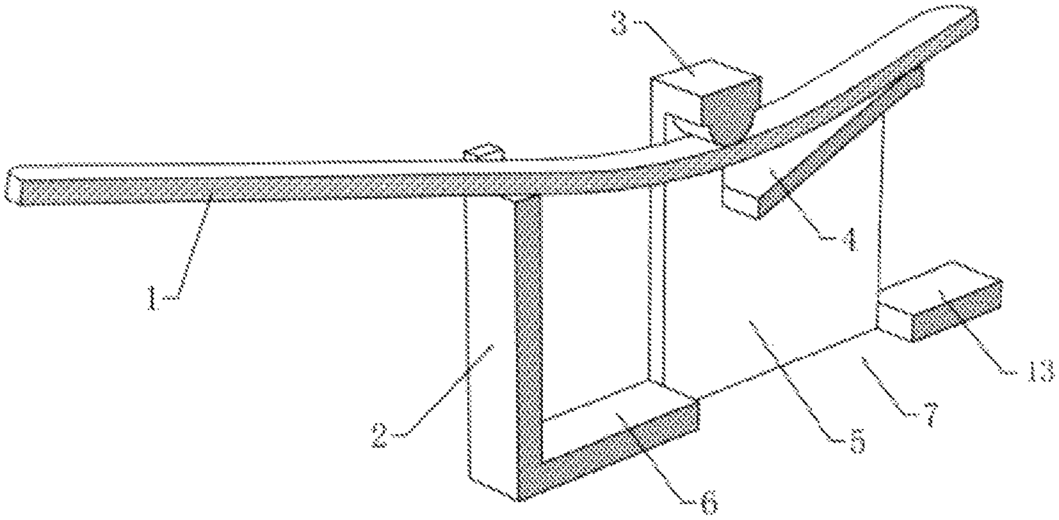
FIG. 8 is a longitudinal sectional view of a high-low bracket unit.
Figure 9:
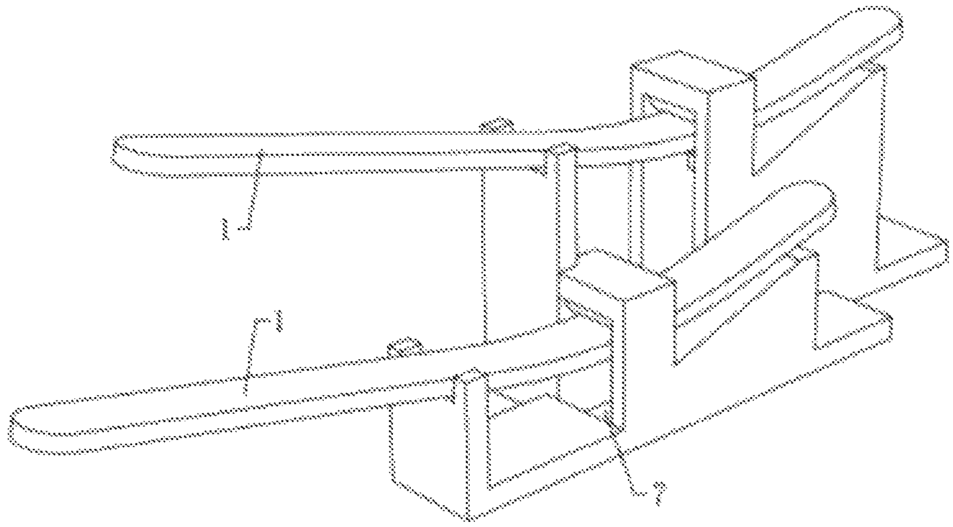
FIG. 9 is an overall structural diagram of a high-low bracket unit.
Figure 10:
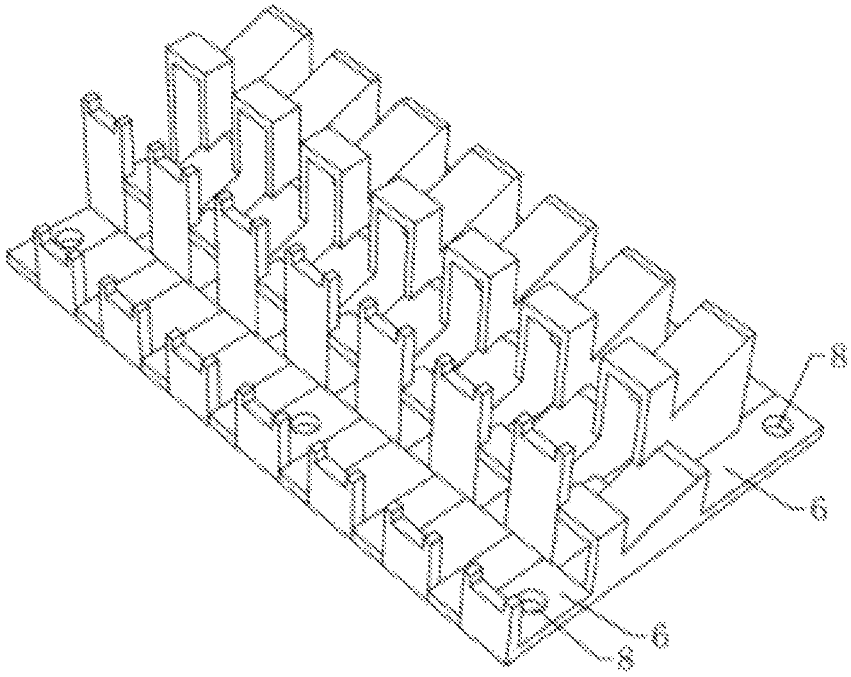
FIG. 10 is an overall structural diagram of a flush high-low carlimba bracket.
Figure 11:
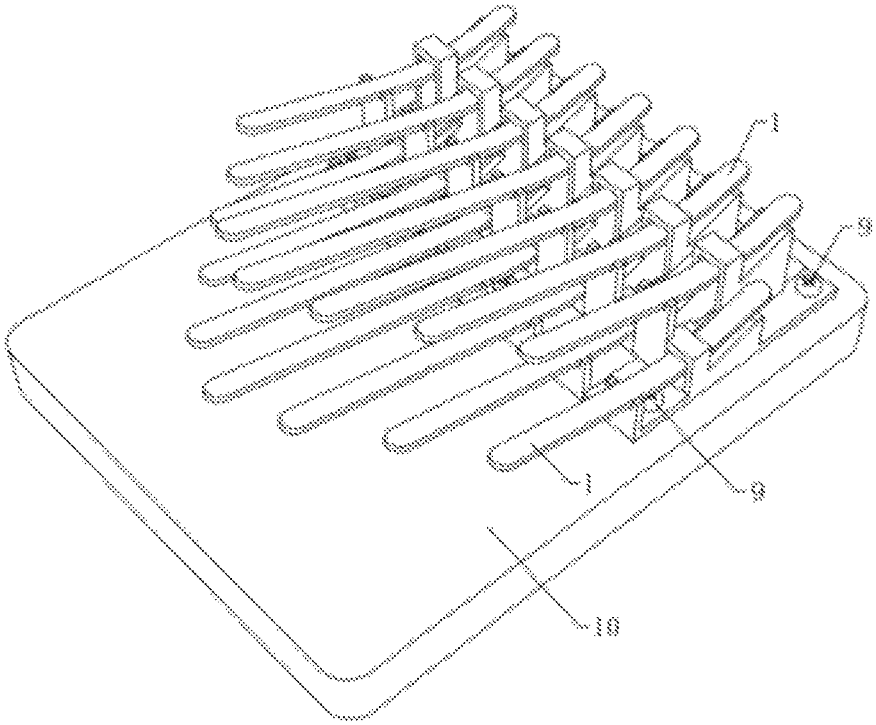
FIG. 11 is an overall structural diagram of a carlimba using a flush high-low carlimba bracket.
Figure 12:
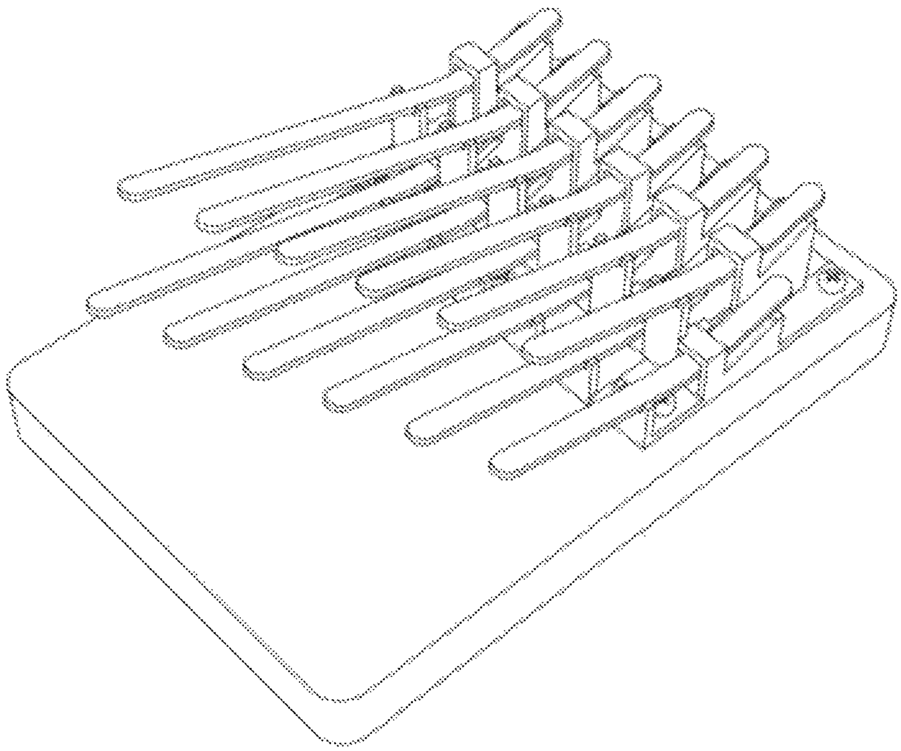
FIG. 12 is an overall structural diagram of another carlimba using a flush high-low carlimba bracket.
Figure 13:
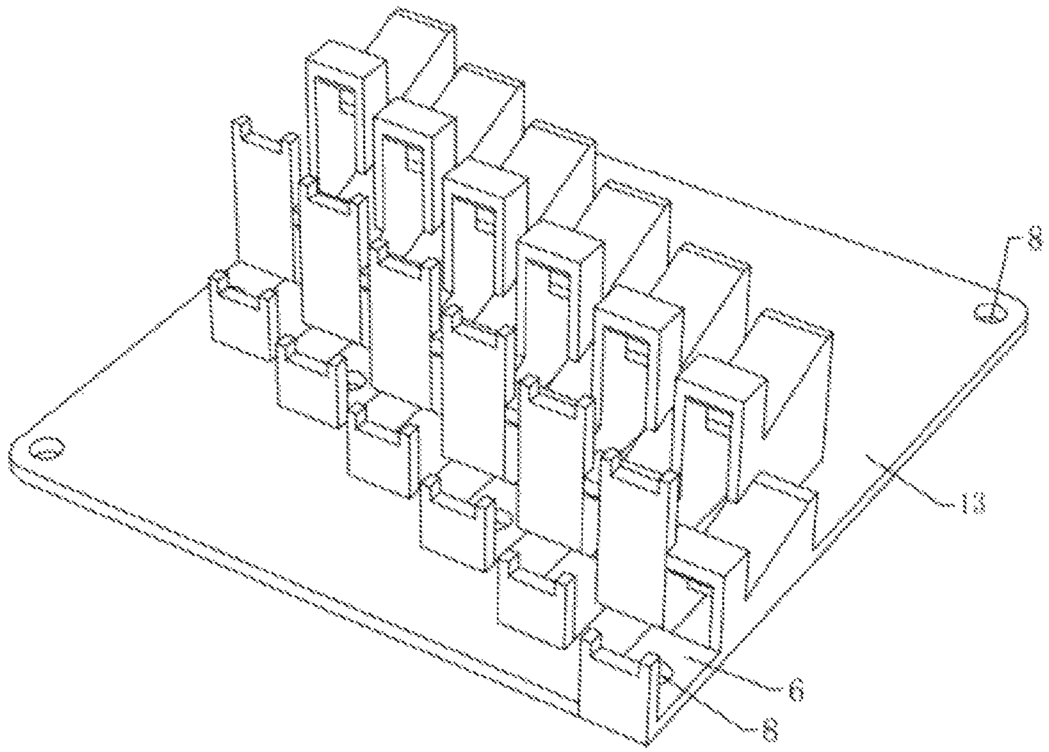
FIG. 13 is an overall structural diagram of a retrograding carlimba bracket.
Figure 14:
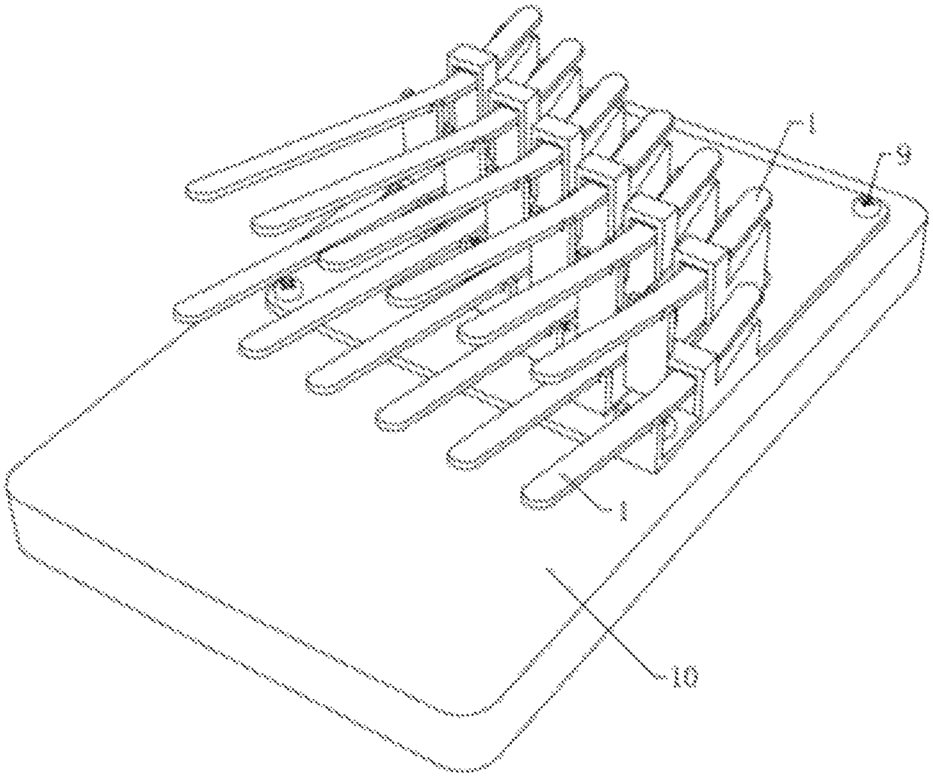
FIG. 14 is an overall structural diagram of a carlimba using a retrograding carlimba bracket.
Figure 15:
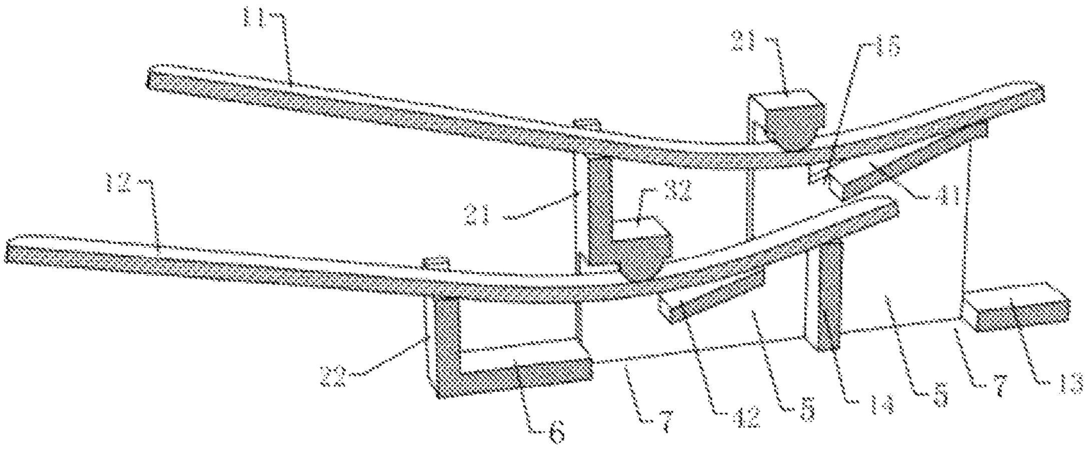
FIG. 15 is a longitudinal sectional view of a double-layer bracket unit.
Figure 16:
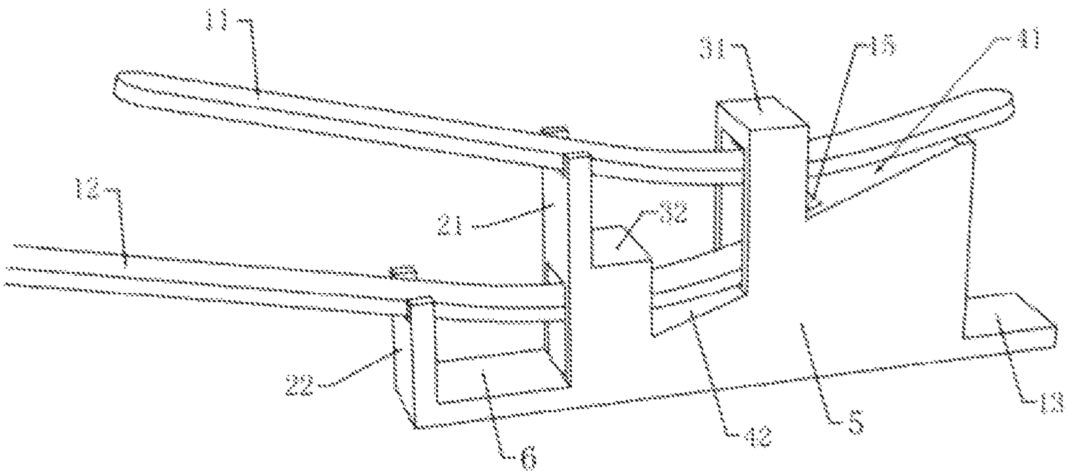
FIG. 16 is an overall structural diagram of a double-layer bracket unit.
Figure 17:
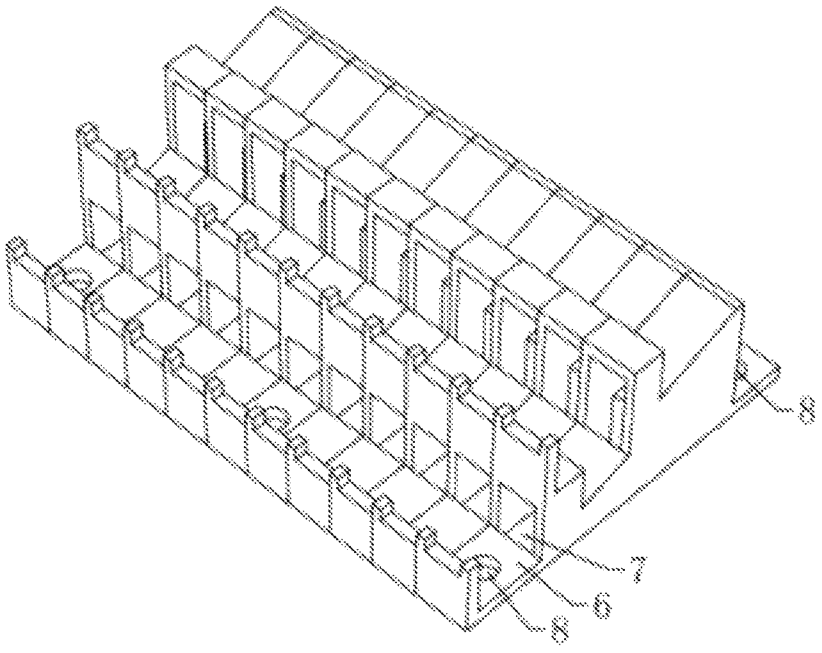
FIG. 17 is an overall structural diagram of a flush double-layer carlimba bracket.
Figure 18:
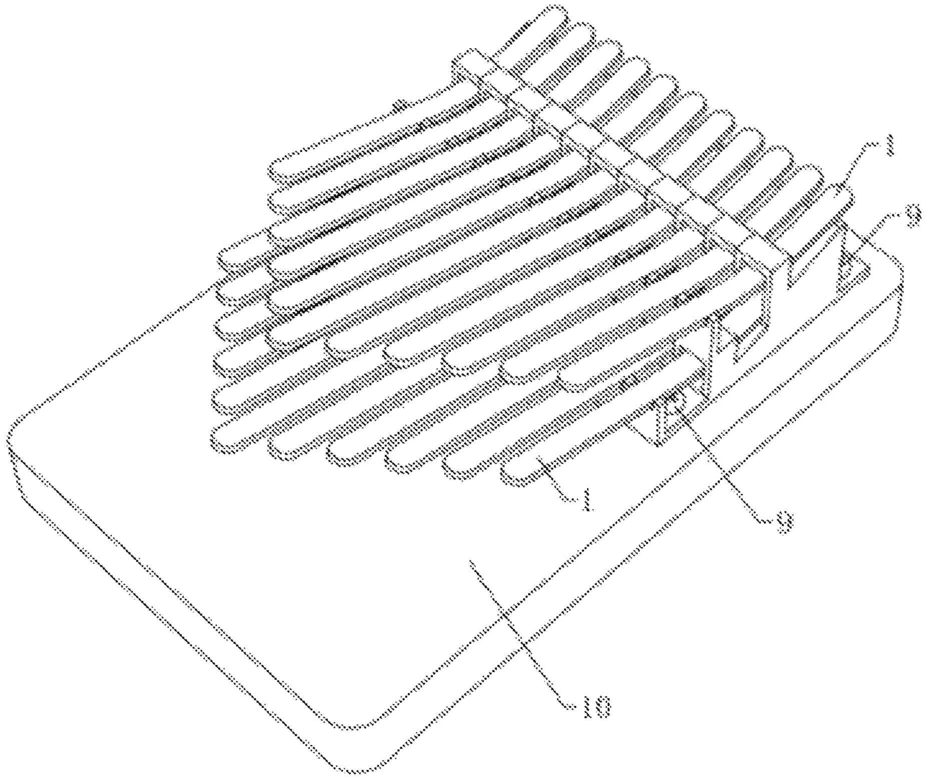
FIG. 18 is an overall structural diagram of a carlimba using a flush double-layer carlimba bracket.
Figure 19:
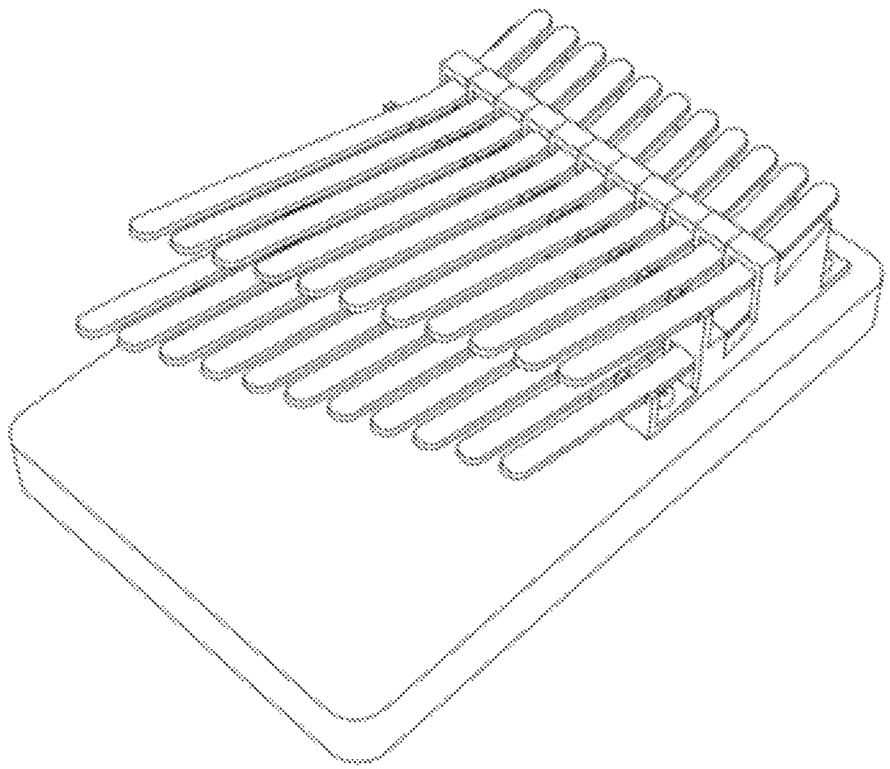
FIG. 19 is an overall structural diagram of another carlimba using a flush double-layer carlimba bracket.
Figure 20:
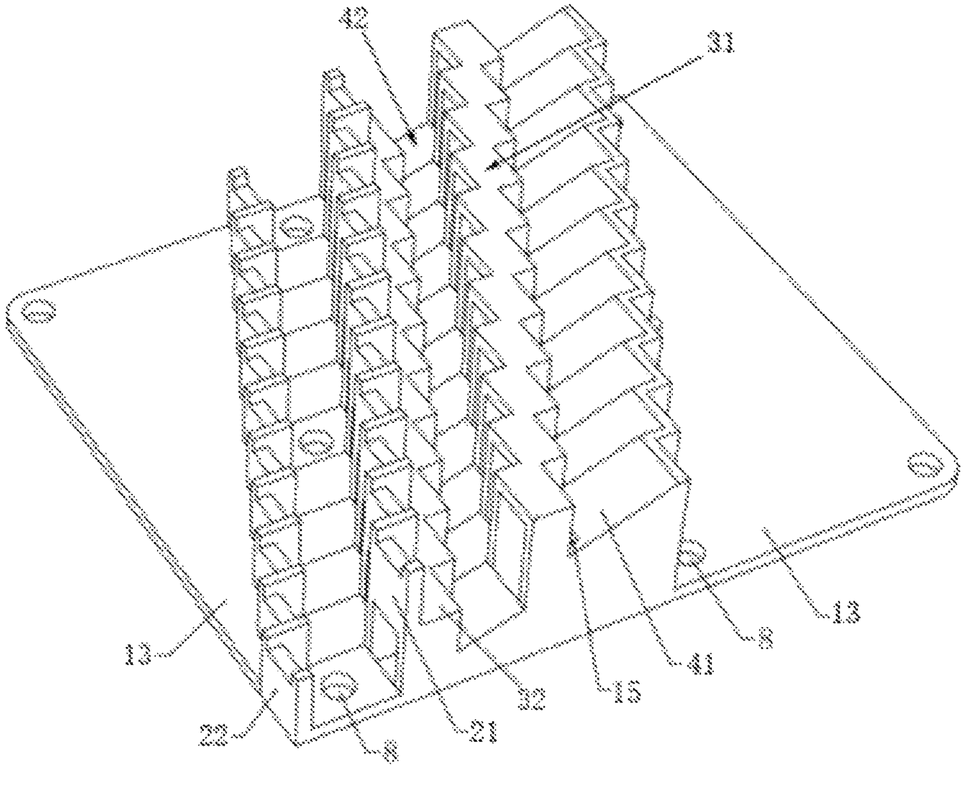
FIG. 20 is an overall structural diagram of a retrograding double-layer carlimba bracket.
Figure 21:
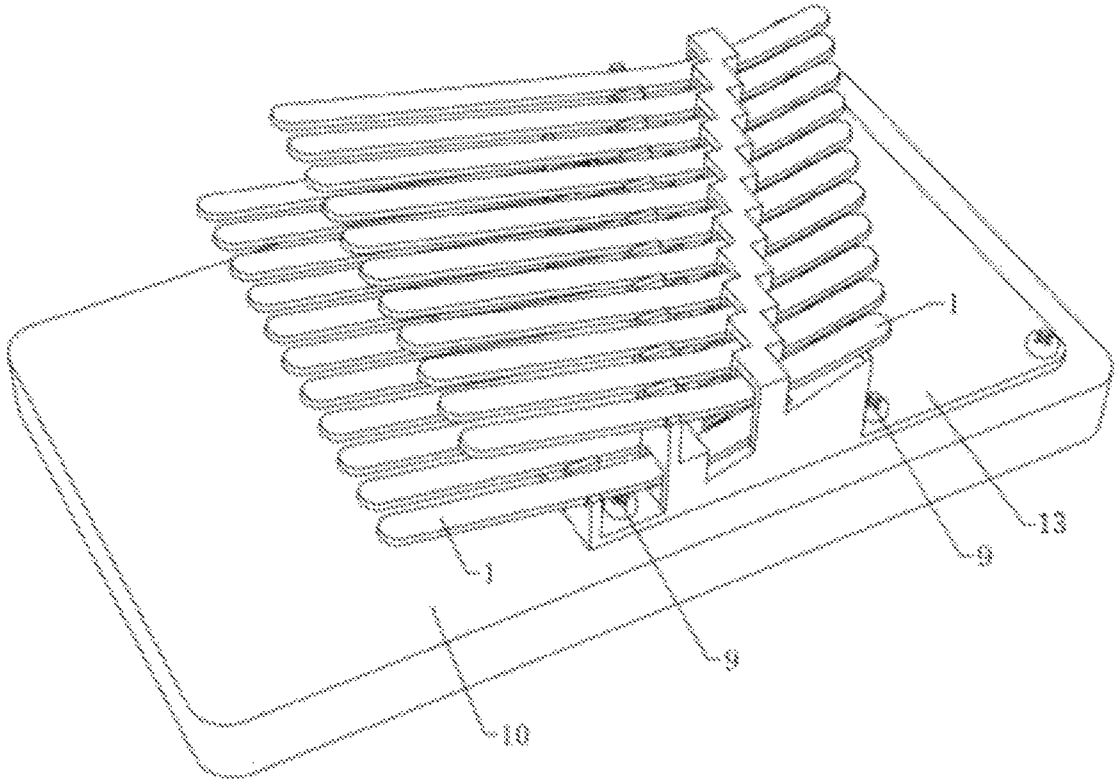
FIG. 21 is an overall structural diagram of a carlimba using a retrograding double-layer carlimba bracket.

As shown in FIGS. 1-23, the embodiments of the present invention provide a carlimba bracket, including bracket units. Referring to FIGS. 1-3, each bracket unit includes a front nut 2, a back nut 4 and a bridge 3; the bridge 3 is located between the front nut 2 and the back nut 4; and a first connecting piece 6 is arranged between the front nut 2 and the bridge 3 and is fixedly connected with the front nut 2 and the bridge 3. A second connecting piece 5 is arranged between the back nut 4 and the bridge 3 and is fixedly connected with the back nut 4 and the bridge 3; and the relative positions of the back nut 4 and the bridge 3 are fixed. During mounting of the carlimba, it is unnecessary to independently mount the front nuts 2, the back nuts 4 and the bridges 3, thereby omitting a tuning step and solving the problem of incorrect sound emission due to a mounting error at the same time. A front supporting position is arranged at the upper part of each front nut 2; a back supporting position is arranged at the upper part of each back nut 4; a downward pressing portion is arranged at the lower part of each bridge 3; and an elastic piece gap is reserved among the pressing portion, the front supporting position and the back supporting position. During mounting, each elastic piece 1 is placed at the upper parts of the front supporting position and the back supporting position and is compressed by the pressing portion of the bridge 3 at the same time.

In a preferred embodiment, the front nuts 2, the back nuts 4, the bridges 3, the first connecting pieces 6 and the second connecting pieces 5 are integrally formed. Further, the front nuts 2, the back nuts 4, the bridges 3, the first connecting pieces 6 and the second connecting pieces 5 are integrally formed through casting, so that the carlimba bracket and the carlimba are convenient to manufacture, accurate in size and small in error.

In a preferred embodiment, each front nut 2 is an upright column, the front supporting position is a groove formed in the upper part of the front nut 2, and the elastic piece 1 is placed in the groove. Each back nut 4 is a supporting plate, and one end, close to the front nut 2, of the back nut 4 is lower than the other. Each second connecting piece 5 is a supporting vertical plate, and each pressing portion is fixed to the upper part of the supporting vertical plate. The second connecting piece 5 (the supporting vertical plate) extends in a direction toward the back nut 4, and the back nut 4 is also fixed to the upper part of the supporting vertical plate (it is noted that the "upper part of the supporting vertical plate" includes two cases: the first case refers to the top of the supporting vertical plate, that is, the upper end of the supporting vertical plate does not protrude from the back nut; and the second case refers to the upper half part of the supporting vertical plate, that is, the upper end of the supporting vertical plate may protrude from the back nut). Each elastic piece 1 penetrates through the front nut 2 and the lower side of the bridge 3 to reach the back nut 4 and is continuously propelled to travel up along the back nut 4 and cross the top end of the upper surface of the back nut 4; and then mounting of one elastic piece 1 is finished.

In the preferred embodiment, each first connecting piece 6 is a connecting plate. It is noted that the connecting plate may be a part of the bottom plate 13. One end of the first connecting piece 6 is fixedly connected to the lower part of the front nut 2, and the other end is fixedly connected to the lower part of each second connecting piece 5 (the supporting vertical plate).

In the preferred embodiment, each second connecting piece 5 (the supporting vertical plate) includes a first supporting vertical plate and a second supporting vertical plate; and the first supporting vertical plate and the second supporting vertical plate are opposite to each other, a gap is reserved therebetween. A cavity is formed among each first supporting vertical plate, the corresponding second supporting vertical plate, the corresponding bridge 3 and the corresponding back nut 4; and a demoulding hole 7 is formed in the lower part of the cavity. After being casted, the bracket may be demoulded from the demoulding holes. With the arrangement of the cavities, the weight of the bracket can be reduced. A bottom plate 13 is further fixedly connected to the lower parts of the first supporting vertical plates and the second supporting vertical plates. The bottom plate 13 is fixedly connected with the first supporting vertical plates and the second supporting vertical plates, that is, the demoulding holes 7 are not closed via the bottom plate 13.

Figure 23:
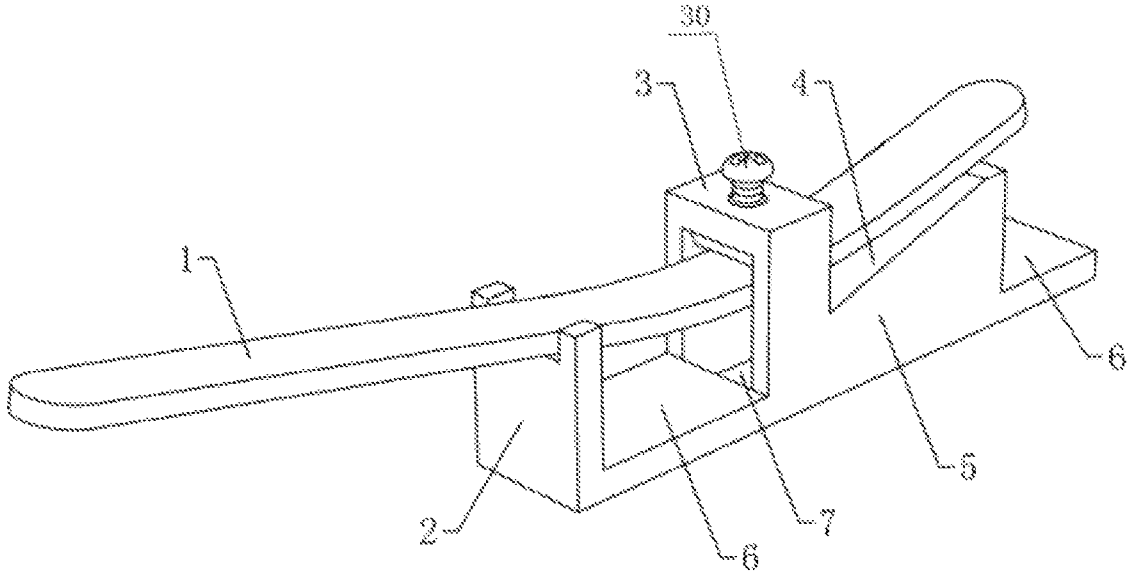
FIG. 23 is an overall structural diagram of a bracket unit according to yet another preferred embodiment of the present invention.

Referring to FIG. 23, in the preferred embodiment, the carlimba bracket further includes auxiliary bridges 30, where auxiliary through holes are formed in the bridges 3; the auxiliary bridges 30 penetrate through the auxiliary through holes; one ends of the auxiliary bridges 30 face downward; and the auxiliary bridges 30 are movable relative to the bridges 3.

Figure 22:
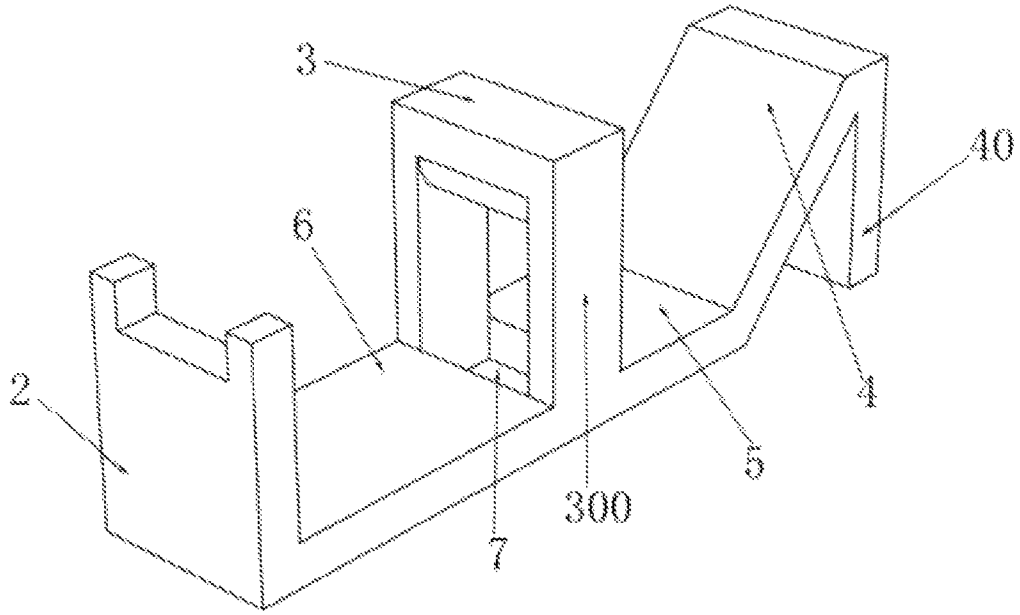
FIG. 22 is an overall structural diagram of a bracket unit according to another preferred embodiment of the present invention.

Referring to FIG. 22, in the preferred embodiment, each first connecting piece 6 is a connecting plate, and each second connecting piece 5 is also a connecting plate (it is noted that the first connecting pieces 6 and the second connecting pieces 5 may serve as the bottom plate 13 at the same time, that is, the front nuts 1 and the back nuts 3 are fixed to the bottom plate 13). Two supporting plates 300 opposite to each other are arranged at the lower part of each bridge 2 and fixed to the first connecting piece 6 and the second connecting piece 5, the bridge 2 is fixed to the upper parts of the two supporting plates 300, and the demoulding hole 7 is formed in each bridge 2. Therefore, demoulding is facilitated during production. Further, one end of each back nut 3 is fixedly connected with the second connecting piece 5, and the other end is connected with a nut supporting plate 40; and the nut supporting plate 40 is fixed to the bottom plate 13.

Referring to FIGS. 3-7, in the preferred embodiment, the carlimba bracket includes a plurality of bracket units. The plurality of bracket units are completely the same and flush arranged. Flush arrangement refers to that the end parts of the plurality of bracket units are flush with each other to form a flush carlimba bracket. The plurality of bracket units are substantially perpendicular to a same straight line; and distances of the end parts of the plurality of bracket units from the straight line are substantially the same. In another embodiment, the carlimba bracket includes a plurality of bracket units. The plurality of bracket units are the same and arranged in a retrograding manner to form a retrograding carlimba bracket. Retrograding arrangement refers to that the plurality of bracket units are arranged in parallel; and with a straight line perpendicular to the first one of the bracket units and intersecting the end part of the first one of the bracket units as a datum line, distances of the end parts of the other bracket units from the datum line are gradually increased.

Referring to FIGS. 8-14, in the preferred embodiment, the carlimba bracket includes a plurality of bracket units. Each bracket unit includes a first bracket unit and a second bracket unit; the front nut 2, the back nut 4 and the bridge 3 of the first bracket unit are higher than those of the second bracket unit; and the first bracket unit and the second bracket unit are fixedly connected with each other to form a high-low bracket unit. The plurality of bracket units are flush arranged to form a flush high-low carlimba bracket. Flush arrangement refers to that the end parts of the plurality of bracket units are flush and are substantially perpendicular to the same straight line; and distances of the end parts of the plurality of bracket units from the straight line are substantially the same. In another embodiment, the carlimba bracket includes a plurality of bracket units. Each bracket unit includes a first bracket unit and a second bracket unit; the front nut 2, the back nut 4 and the bridge 3 of the first bracket unit are higher than those of the second bracket unit; and the first bracket unit and the second bracket unit are fixedly connected with each other to form a high-low bracket unit. The plurality of bracket units are arranged in the retrograding manner, and the first bracket units and the second bracket units are also arranged in the retrograding manner, so as to form a retrograding high-low bracket carlimba bracket. Retrograding arrangement refers to that the plurality of bracket units are arranged in parallel; and with a straight line perpendicular to the first one of the bracket units and intersecting the end part of the first one of the bracket units as a datum line, distances of the end parts of the other bracket units from the datum line are gradually increased.

In the preferred embodiment, the plurality of bracket units are integrally formed, and the plurality of front nuts 1 are mutually connected and fixed, so that the carlimba bracket is of a more stable and simpler structure and is convenient to manufacture. When the plurality of bracket units form the carlimba bracket, two adjacent bracket units jointly share one supporting vertical plate 5.

Referring to FIGS. 15-21, in the preferred embodiment, the carlimba bracket includes first bracket units and second bracket units. Each first bracket unit is located at the upper part of each second bracket unit; and the first bracket unit and the second bracket unit are integrally formed to form a double-layer bracket unit. Each first bracket unit includes a first front nut 21, a first back nut 41 and a first bridge 31; each second bracket unit includes a second front nut 22, a second back nut 42 and a second bridge 32; the second bridge 32 is located at the lower part of the first front nut 21; the second back nut 42 is located at the lower part of the first bridge 31 and is supported by each back column 14; and the back column 14 is located in a cavity of the first bracket unit. The first bracket unit and the second bracket unit are stacked up and down; a first elastic piece 11 is inserted into the first bracket unit; a second elastic piece 12 is inserted into the second bracket unit; and the first elastic piece 11 and the second elastic piece 12 are also stacked up and down, a reasonable gap is formed therebetween, without affecting each other. The first bracket unit and the second bracket unit are arranged one behind the other without affecting each other. A top opening 15 is further formed in the first bracket unit and in the upper side of the first back nut and is located at one end, close to the first bridge. With the arrangement of the top opening 15, demoulding can also be facilitated.

In the preferred embodiment, the plurality of double-layer bracket units are flush arranged to form a flush double-layer carlimba bracket; and the plurality of bracket units are arranged in the retrograding manner to form a retrograding carlimba bracket.

The present invention further provides a carlimba, including elastic pieces 1 and the carlimba bracket according to any one of the items. The elastic pieces 1 are inserted into the elastic piece gaps.

In the preferred embodiment, the carlimba further includes a body 10; and the carlimba bracket is fixed to the body 10. Through holes 8 are formed in the bottom plate 13, and then the carlimba bracket is fixed to the upper part of the body 10 through screws 9.

In the preferred embodiment, the elastic pieces 1 may be arranged according to ordinal scales or according to symmetric scales. The ordinal scales refer to that scales of the elastic pieces 1 are arranged in an order from high to low or from low to high. The symmetric scales refer to scales with low scales arranged in the middle and high scales arranged toward the two sides respectively.

If the carlimba bracket includes the first bracket units and the second bracket units, and the first bracket units and the second bracket units are stacked up and down, the elastic pieces 1 may be arranged according to double-layer ordinal scales or double-layer symmetric scales.

In the present invention, the first connecting pieces 6 and the second connecting pieces 5 are provided. By fixedly connecting the front nuts 2, the back nuts 4 and the bridges 3 through the first connecting pieces 6 and the second connecting pieces 5, during assembly, there is no need for assembling the carlimba bracket. Compared with the existing the carlimba, the carlimba is convenient to assemble, and an error that may occur during assembly of the carlimba bracket is avoided. The elastic piece 1 gaps are reserved among the front nuts 2, the back nuts 4 and the bridges 3, and the elastic pieces 1 are just inserted into the elastic piece 1 gaps, so that assembly is convenient; and the elastic pieces 1 are convenient to replace, and various scale arrangements may be formed by replacing the elastic pieces 1. In addition, different carlimba brackets may further be arranged to obtain different scale arrangements.

Various technical features of the above embodiments can be arbitrarily combined. For concise description, not all possible combinations of the technical features in the above embodiments are described. However, the combinations of these technical features should be considered as a range disclosed in this specification if they do not conflict with each other.

The above embodiments express the specific implementations of the present invention merely, the description are more specific and detailed, but they cannot be understood as limiting to the patent scope of the present invention. It should be noted that, for a person of ordinary skill in the art, various modifications and improvements can be made without departing from the concept of the present invention, which shall be within the protection range of the present invention.

Therefore, the protection scope of the present invention shall be subject to the protection scope defined by the claims.

What is claimed is:

1. A carlimba bracket, comprising bracket units, wherein each bracket unit comprises a front nut, a back nut and a bridge; the bridge is located between the front nut and the back nut; a first connecting piece is arranged between the front nut and the bridge and fixedly connected with the front nut and the bridge; a second connecting piece is arranged between the back nut and the bridge and fixedly connected with the back nut and the bridge; a front supporting position is arranged at the upper part of the front nut; a back supporting position is arranged at the upper part of the back nut; a downward pressing portion is arranged at the lower part of the bridge; and an elastic piece gap is reserved among the pressing portion, the front supporting position and the back supporting position.

2. The carlimba bracket according to claim 1, wherein the front nuts, the back nuts, the bridges, the first connecting pieces and the second connecting pieces are integrally formed.

3. The carlimba bracket according to claim 1, wherein each front nut is an upright column, and each front supporting position is a groove formed in the upper part of the front nut; each back nut is a supporting plate, and one end, close to the front nut, of the back nut is lower than the other end; each second connecting piece is a supporting vertical plate, and the pressing portion is fixed to the upper part of the supporting vertical plate; the supporting vertical plate extends in a direction toward the back nut, and the back nut is further fixed onto the upper part of the supporting vertical plate; and each first connecting piece is a connecting plate, one end of the first connecting piece is fixedly connected to the lower part of the front nut, and the other end is fixedly connected to the lower part of the supporting vertical plate.

4. The carlimba bracket according to claim 3, wherein each supporting vertical plate comprises a first supporting vertical plate and a second supporting vertical plate; the first supporting vertical plate and the second supporting vertical plate are opposite to each other, a gap is reserved therebetween; a cavity is formed among the first supporting vertical plate, the second supporting vertical plate, the bridge and the back nut; the lower end of the cavity is opened to form a demoulding hole; and a bottom plate is further fixedly connected with the lower parts of the first supporting vertical plate and the second supporting vertical plate and is fixedly connected with the first supporting vertical plate and the second supporting vertical plate.

5. The carlimba bracket according to claim 1, further comprising auxiliary bridges; auxiliary through holes are formed in the bridges; and the auxiliary bridges penetrate through the auxiliary through holes and are movable relative to the bridges.

6. The carlimba bracket according to claim 1, wherein each first connecting piece is a connecting plate, and each second connecting piece is also a connecting plate; two supporting plates opposite to each other are arranged at the lower part of each bridge and fixed onto the first connecting piece and the second connecting piece, each bridge is fixed onto the upper parts of the two supporting plates, and the demoulding hole is formed in the lower part of each bridge; and one end of each back nut is fixedly connected with the second connecting piece, and the other end is connected with a nut supporting plate.

7. The carlimba bracket according to claim 1, comprising a plurality of bracket units, wherein the plurality of bracket units are flush arranged or arranged in a retrograding manner.

8. The carlimba bracket according to claim 1, comprising a plurality of bracket units, wherein each bracket unit comprises a first bracket unit and a second bracket unit, the front nut, the back nut and the bridge of the first bracket unit are higher than those of the second bracket unit, and the first bracket unit and the second bracket unit are fixedly connected to each other;

the plurality of bracket units are flush arranged; or the plurality of bracket units are arranged in a retrograding manner, and the first bracket units and the second bracket units are also arranged in the retrograding manner.

9. The carlimba bracket according to claim 1, comprising first bracket units and second bracket units, wherein each first bracket unit is located at the upper part of each second bracket unit; the first bracket unit and the second bracket unit are integrally formed; the first bracket unit comprises a first front nut, a first back nut and a first bridge; the second bracket unit comprises a second front nut, a second back nut and a second bridge; the second bridge is located at the lower part of the first front nut; and the second back nut is located at the lower part of the first bridge.

10. A carlimba, comprising elastic pieces and the carlimba bracket according to claim 1, the elastic pieces being inserted into the elastic piece gaps.

11. The carlimba according to claim 10, wherein the carlimba further comprises a body, which the carlimba bracket is fixed to the body.

* * * * *